(No Model.)
C. R. JONES.
THILL COUPLING.
No. 573,152. Patented Dec. 15, 1896.
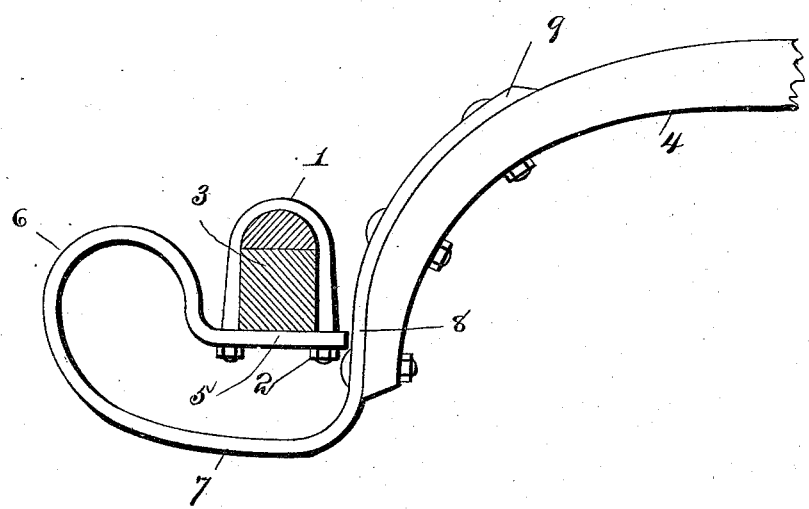
WITNESSES
Marcus L. Byng
W. M. Mason.
INVENTOR,
Clarence R. Jones,
by John Wedderburn
Attorney

UNITED STATES PATENT OFFICE.

CLARENCE R. JONES, OF ALTON BAY, NEW HAMPSHIRE.

THILL-COUPLING.

SPECIFICATION forming part of Letters Patent No. 573,152, dated December 15, 1896.

Application filed August 7, 1896. Serial No. 602,024. (No model.)

*To all whom it may concern:*

Be it known that I, CLARENCE R. JONES, a citizen of the United States, residing at Alton Bay, in the county of Belknap and State of New Hampshire, have invented certain new and useful Improvements in Thill-Couplings; and I do hereby declare the following to be a full, clear, and exact description of the invention, such as will enable others skilled in the art to which it appertains to make and use the same.

My invention relates to thill-couplings.

The ordinary form of thill-coupling soon becomes loose and gives forth a disagreeable rattle when in use. Various devices have been brought forth to obviate this difficulty and different kinds of antirattler-springs have been employed.

My object is to provide an antirattler thill-coupling of novel and peculiar construction, which will be exceedingly cheap and strong, and may be quickly applied to or removed from the axle of the vehicle.

Having this object in view, my invention consists of an antirattler-spring thill-coupling of novel and peculiar construction, as will appear more in detail hereinafter.

The accompanying drawing represents my invention in side elevation and in use.

The numeral 1 designates a clip of ordinary construction, which is adapted for reception on the axle 3, being held thereto by suitable nuts 2.

The numeral 4 designates one of the shafts of the vehicle.

My improved thill-coupling is made from a single piece of properly tempered steel of the proper width and thickness, which is bent into peculiar shape. It is formed into a clamping-plate 5, through which the arms of the clip loosely pass, said clamping-plate being located on the under side of the axle. The spring is then bent upwardly to form an arc 6, which at 7 extends down into substantially parallel relation to the clamping-plate 5, and is then bent upwardly into a forwardly-projecting curve 8. The end of the curved portion 8 is suitably connected by welding or otherwise to the iron 9 on the rear end of the shaft. It will thus be seen that the shaft is fastened to the axle by a flexible connection, which is also resilient, so that there is no possibility of rattling of any kind. By unscrewing the nuts of the clips the springs can be readily removed, so that the shafts can be taken off and placed on another vehicle, if desirable.

Having thus described my invention, what I claim as new, and desire to secure by Letters Patent, is—

In a thill-coupling, the combination with an axle and a shaft, of a clip which straddles the axle and is provided with screw-threaded arms, nuts on the arms, and a spring which is bent at one end into a clamping-plate through which the arms of the clip pass, said spring being then bent into a rearwardly-disposed arc-shaped portion, thence into a downwardly and forwardly extending portion that lies beneath and parallel to the clamping-plate, and being finally extended upwardly and curved forwardly and connected to the shaft.

In testimony whereof I have signed this specification in the presence of two subscribing witnesses.

CLARENCE R. JONES.

Witnesses:
FRED H. DOWNING,
JONA. H. DOWNING.